UNITED STATES PATENT OFFICE.

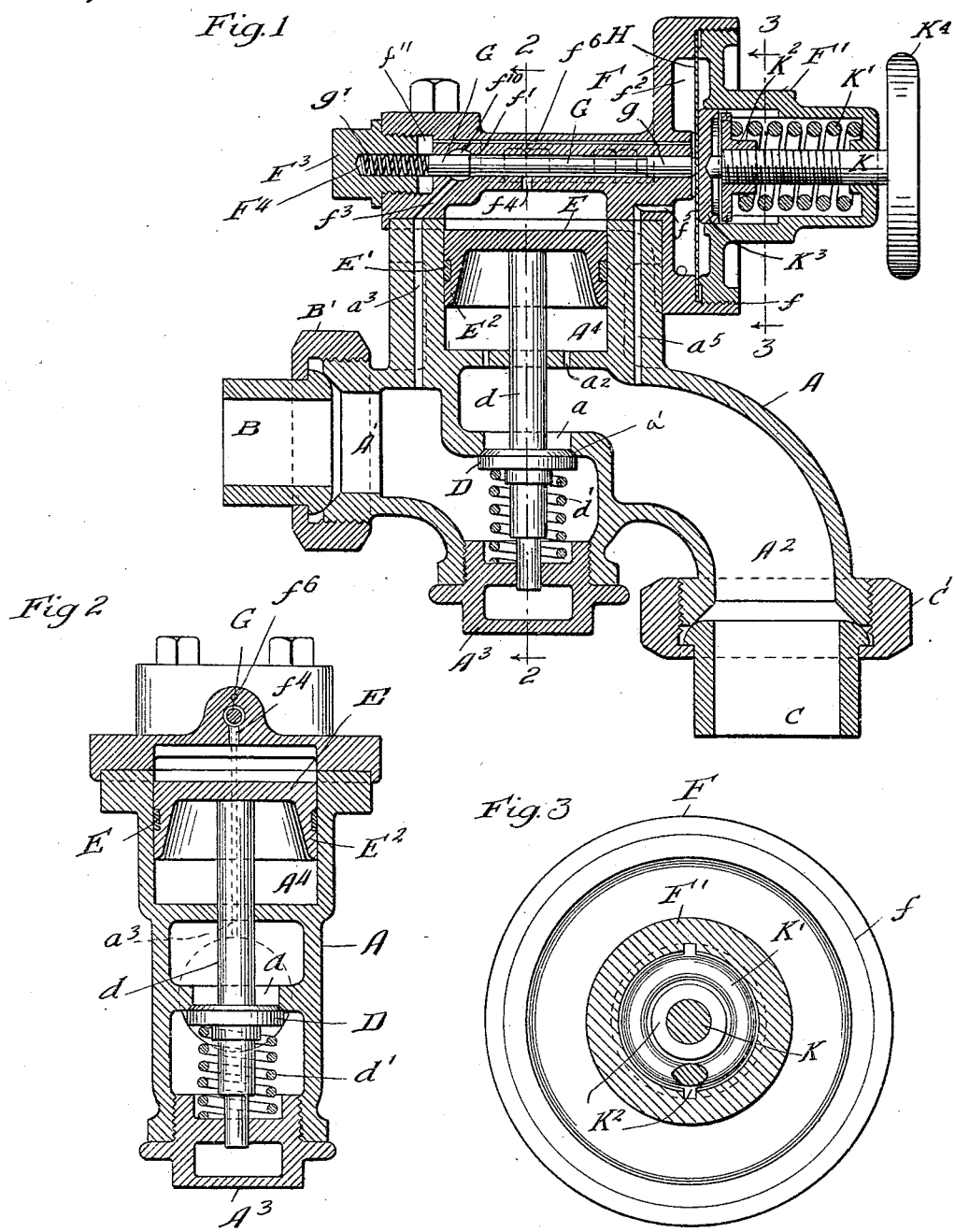

WILLIAM H. O'CONNOR, OF NEWARK, NEW JERSEY.

STEAM OR OTHER FLUID PRESSURE REGULATOR.

941,092.  Specification of Letters Patent. Patented Nov. 23, 1909.

Application filed March 25, 1908. Serial No. 423,205.

*To all whom it may concern:*

Be it known that I, WILLIAM H. O'CONNOR, a citizen of the United States, residing in Newark, in the county of Essex and State of New Jersey, have invented a new and useful Improvement in Steam or other Fluid Pressure Regulators, of which the following is a specification.

My invention relates to improvements in regulators for controlling or maintaining the pressure of steam or other fluid.

The object of my invention is to provide a steam or other fluid pressure regulator of a simple, efficient and durable construction, which will be certain and reliable in action which will respond quickly to slight variations of pressure in the outlet or delivery pipe or connection, in which all the parts will be readily accessible, and especially the auxiliary valve, which is the most delicate part of the regulator, and which will be more readily adapted for railroad use than the regulators heretofore in use.

My invention consists in the means I employ to practically accomplish this object or result. That is to say, it consists in a fluid pressure regulator having a body or main shell, provided with a supply or inlet and an outlet or delivery arranged at right angles to each other, combined with a main valve and piston and an auxiliary valve, adjusting screw and spring, arranged at right angles to the main valve and piston.

It further consists in connection with these parts, in the provision of means for balancing the pressure upon the auxiliary valve, and thus causing the same to act quickly and certainly and to respond with great delicacy to slight variations of steam or other fluid pressure in the delivery system.

It further consists in the novel construction of parts and devices and in the novel combinations of parts and devices herein shown and described and more particularly specified in the claims.

In the accompanying drawing forming a part of this specification, Figure 1 is a central vertical section of a fluid pressure regulator embodying my invention. Figs. 2 and 3 are sections on lines 2—2 and 3—3 respectively of Fig. 1.

In the drawing, A represents the main body or shell of the regulator, the same having a supply or inlet $A^1$ connected with the supply pipe B by a coupling $B^1$ and an outlet or delivery $A^2$ which is arranged at right angles to the inlet $A^1$ and connected with the outlet or delivery pipe C by a coupling $C^1$.

D is the main valve closing the main port $a$ between the inlet $A^1$ and outlet $A^2$ against valve seat $a^1$, its stem $d$ being surrounded by a spring $d^1$ which bears against the screw cap $A^3$ in which the lower end of the stem $d$ has a sliding bearing.

The main body or shell of the regulator is furnished with a piston chamber or cylinder $A^4$ to receive the hanging piston E which rests on the upper end of the stem $d$ of the main valve D. The piston E is of larger diameter or area than the valve D so that the fluid pressure on the upper or outer end of the piston E may exceed that on the main valve D sufficiently to overcome the tension of the spring $d^1$ which tends to hold the main valve D closed. The piston E is furnished with a packing $E^1$ and is preferably made of inverted cup shape, preferably about as illustrated in the drawing, so that its contact with the piston stem $d$ may be at or above its center of gravity and thus materially reduce all liability of the hanging piston sticking or cramping in the cylinder or piston chamber $A^4$ of the shell A. The main shell A is provided with one or more small ports or openings $a^2$ into the piston chamber $A^4$ from the outlet or delivery side of the main valve D so that the outlet or delivery pressure of the fluid may act against this side of the piston as well as against the upper face of the main valve D.

F is the auxiliary valve shell, the same being preferably made in a separate piece from the main shell A and securely connected thereto by any suitable means; and $F^1$ is the spring case or shell connected to the auxiliary valve shell F by screw threads $f$.

G is the auxiliary valve arranged at right angles to the main valve and piston and having a stem $g$ abutting at one end against the diaphragm H which is interposed between the auxiliary valve shell F and the spring case or shell $F^1$ and between the auxiliary stem $g$ and the adjusting screw K and pressure regulating spring $K^1$ which bears at one end against the flanged nut $K^2$ of the adjusting screw. To give the adjusting screw an extended bearing against the diaphragm, it is provided with a bearing plate or cap $K^3$. The adjusting screw K is furnished with a handle $K^4$ for turning it.

The auxiliary valve shell F is furnished with a chamber $f^{10}$ for the auxiliary valve and a valve seat $f^1$, and it is also provided with a chamber $f^2$ for the diaphragm, the diaphragm chamber $f^2$ being in part formed in the adjacent face of the spring case or shell $F^1$.

The auxiliary valve chamber $f^{10}$ communicates with the inlet side $A^1$ of the main shell A through a port $f^3$ in the auxiliary shell F, and a port $a^3$ in the main shell A. The auxiliary valve chamber $f^{10}$ also communicates with the piston chamber $A^4$ through a port $f^4$ in the auxiliary shell F, which closes the upper end of the piston chamber $A^4$.

The diaphragm chamber $f^2$ communicates with the outlet or delivery side $A^2$ of the main shell A through a port $f^5$ in the auxiliary shell and the connecting port $a^5$ in the main shell A.

The auxiliary shell F is furnished with a screw plug $F^3$ which closes the outer end of the auxiliary valve chamber $f^{10}$ and is provided with a pocket $F^4$ to receive a spring $g^1$ which bears against the auxiliary valve at the opposite end of the diaphragm H.

To enable the fluid pressure to be balanced on the auxiliary valve and thus increase its quickness, certainty and delicacy of response to variations of fluid pressure in the delivery or outlet chamber $A^2$ of the pressure regulator, I provide the auxiliary shell F with a port or communication $f^6$ between the diaphragm chamber $f^2$ and the chamber $f^{11}$ at the rear end of the auxiliary valve stem G, said connecting port or communication being preferably formed in the auxiliary shell F.

The operation is as follows: When the steam or other fluid pressure in the outlet or delivery chamber $A^2$ of the regulator falls below the point or degree required, and to which the tension of the pressure controlling spring $K^1$ of the regulator is set by the adjusting screw K, said spring acts against the diaphragm H and opens the auxiliary valve G against the tension of its light spring $g^1$, thus permitting further steam or fluid to pass through the ports $a^3$ $f^3$ from the inlet chamber $A^1$ of the regulator into the auxiliary valve chamber and through the port $f^4$ into the piston chamber $A^4$, and thus cause the piston E to open the main valve D and admit the steam into the delivery chamber $A^2$ until the pressure therein is restored to the required degree; and then this higher steam pressure in the delivery chamber $A^2$ passing through the ports $a^5$ $f^4$ into the diaphragm chamber $f^2$ will act upon the diaphragm and retract the pressure regulating spring $K^1$, and thus permit the spring $g^1$ to close the auxiliary valve G and thereby allow the initial pressure acting under the main valve D to force it to its seat, the piston in this operation being acted upon by the fluid passing through the ports $a^2$. In practical operation, however, it will of course be understood that the opening and closing movement of the main valve is ordinarily not such as to entirely close the port $a$, but only to check or retard the flow of steam or other fluid through the same as required to maintain the proper pressure in the delivery chamber $A^2$ or the apparatus to which the steam is delivered therefrom.

While in the drawing I have illustrated the shell portion of the regulator as being made in three parts A, F and $F^1$, it will be understood that it may be composed of a greater or less number of pieces. The construction shown in the drawing is that which I prefer to use.

I claim:—

1. A fluid pressure regulator comprising a main shell or body having its inlet and delivery arranged at right angles to each other, in combination with a main valve and piston and an auxiliary valve acted upon by the steam pressure at both ends thereof, a diaphragm, pressure regulating spring and adjusting screw, said main valve and piston being at right angles to the auxiliary valve, substantially as specified.

2. A fluid pressure regulator comprising a main shell or body having its inlet and delivery arranged at right angles to each other, in combination with a main valve and hanging piston and an auxiliary valve acted upon by the steam pressure at both ends thereof, a diaphragm, and pressure regulating spring and adjusting screw, substantially as specified.

3. A fluid pressure regulator comprising a main shell or body having its inlet and delivery arranged at right angles to each other, in combination with a main valve and piston, and an auxiliary valve acted upon by the steam pressure at both ends thereof, a diaphragm, pressure regulating spring and adjusting screw, and means for admitting fluid pressure to each end of the auxiliary valve to balance the same, substantially as specified.

4. A fluid pressure regulator comprising a main shell or body having its inlet and delivery arranged at right angles to each other, in combination with a main valve and piston, and an auxiliary valve acted upon by the steam pressure at both ends thereof, a diaphragm, pressure regulating spring and adjusting screw, said piston being of an inverted cup shape and resting on the upper end of the stem of the main valve, substantially as specified.

5. In a fluid pressure regulator, the combination with a main shell or body having an inlet chamber and an outlet chamber, a piston chamber and a main valve seat, of a main valve, a spring therefor, a main valve stem, a piston resting on said main valve stem, an auxiliary valve and auxiliary valve shell having a valve chamber communicating with the inlet chamber of the main shell and with the piston chamber, and provided with a diaphragm and diaphragm chamber in communication with the outlet chamber of the main shell, said auxiliary valve shell having a connecting port to balance the pressure on the auxiliary valve, substantially as specified.

6. In a fluid pressure regulator, the combination with a main shell or body having an inlet chamber and an outlet chamber, a piston chamber and a main valve seat, of a main valve, a spring therefor, a main valve stem, a piston resting on said main valve stem, an auxiliary valve and auxiliary valve shell having a valve chamber communicating with the inlet chamber of the main shell and with the piston chamber, and provided with a diaphragm and diaphragm chamber in communication with the outlet chamber of the main shell, said auxiliary valve shell having a connecting port to balance the pressure on the auxiliary valve, a pressure regulating spring, an adjusting screw and a spring shell inclosing said spring and adjusting screw, substantially as specified.

7. In a fluid pressure regulator, the combination with a main shell or body having an inlet chamber and an outlet chamber, a piston chamber and a main valve seat, of a main valve, a spring therefor, a main valve stem, a piston resting on said main valve stem, an auxiliary valve and auxiliary valve shell having a valve chamber communicating with the inlet chamber of the main shell, and with the piston chamber, and provided with a diaphragm and diaphragm chamber in communication with the outlet chamber of the main shell, said auxiliary valve shell having a connecting port to balance the pressure on the auxiliary valve, a pressure regulating spring, an adjusting screw and a spring shell inclosing said spring and adjusting screw, and a spring bearing against the opposite end of the auxiliary valve from the diaphragm, substantially as specified.

8. In a fluid pressure regulator, the combination with a main shell or body having an inlet chamber and an outlet chamber, a piston chamber and a main valve seat, of a main valve, a spring therefor, a main valve stem, a piston resting on said main valve stem, an auxiliary valve and auxiliary valve shell having a valve chamber communicating with the inlet chamber of the main shell and with the piston chamber, and provided with a diaphragm and diaphragm chamber in communication with the outlet chamber of the main shell, said auxiliary valve shell having a connecting port to balance the pressure on the auxiliary valve, a pressure regulating spring, an adjusting screw, and a spring shell inclosing said spring and adjusting screw, said inlet and outlet chambers of the main shell being arranged at an angle to each other, substantially as specified.

9. In a fluid pressure regulator, the combination with a main shell or body having an inlet chamber and an outlet chamber, a piston chamber and a main valve seat, of a main valve, a spring therefor, a main valve stem, a piston resting on said main valve stem, an auxiliary valve and auxiliary valve shell having a valve chamber communicating with the inlet chamber of the main shell and with the piston chamber, and provided with a diaphragm and diaphragm chamber in communication with the outlet chamber of the main shell said auxiliary valve shell having a connecting port to balance the pressure on the auxiliary valve, a pressure regulating spring, an adjusting screw and a spring shell inclosing said spring and adjusting screw, said main and auxiliary valves being at right angles to each other, substantially as specified.

10. In a fluid pressure regulator, the combination with a main shell having an inlet chamber $A^1$ and outlet chamber $A^2$, and provided with a main port $a$ between said inlet and outer chambers, and with a valve seat $a^1$ surrounding said port $a$, said main shell being also provided with a piston chamber $A^4$, and with a port $a^2$ connecting said piston chamber with said outlet chamber, of a main valve D closing said main port $a$ and provided with a stem $d$ and a spring $d^1$ acting to hold said main valve D closed, a piston E adapted to reciprocate in said piston chamber $A^4$ and resting on said main valve stem $d$, an auxiliary valve shell F having a valve chamber $f^{10}$ and a diaphragm chamber $f^2$, an auxiliary valve G reciprocating in said auxiliary valve shell F, said main shell A and auxiliary shell F having connecting ports $a^3$ $f^3$ communicating between said inlet chamber $A^1$ and valve chamber $f^{10}$, and connecting ports $a^5$ and $f^5$ communicating between said diaphragm chamber $f^2$ and outlet chamber $A^2$, said auxiliary shell F having a connecting port $f^4$ between said auxiliary valve chamber $f^{10}$ and said piston chamber $A^4$, a spring inclosing shell $F^1$ secured to the end of said auxiliary valve shell F, a diaphragm H between said auxiliary shell F and spring inclosing shell $F^1$, a pressure controlling spring $K^1$ acting upon said diaphragm, and an adjusting screw K for regulating the tension of said spring $K^1$, substantially as specified.

WILLIAM H. O'CONNOR.

Witnesses:
CHARLES A. McMURRAY,
THOMAS D. RYON.